US008134649B2

(12) United States Patent
Rogers

(10) Patent No.: US 8,134,649 B2
(45) Date of Patent: Mar. 13, 2012

(54) IR SIGNAL CROSS-TALK ELIMINATION

(75) Inventor: Harlan Rogers, Orange, CA (US)

(73) Assignee: Mitsubishi Electric Visual Solutions America, Inc., Irvine, CA (US)

(*) Notice: Subject to any disclaimer, the term of this patent is extended or adjusted under 35 U.S.C. 154(b) by 380 days.

(21) Appl. No.: 12/544,407

(22) Filed: Aug. 20, 2009

(65) Prior Publication Data
US 2010/0053465 A1    Mar. 4, 2010

Related U.S. Application Data

(60) Provisional application No. 61/093,647, filed on Sep. 2, 2008.

(51) Int. Cl.
  *H04N 5/44* (2006.01)
(52) U.S. Cl. ........ 348/734; 348/706; 348/725; 348/705; 348/522; 348/569; 340/426.13; 340/4.11; 340/12.22; 340/815.6; 341/175; 341/176
(58) Field of Classification Search .......... 348/734, 348/706, 725, 705, 522, 569; 340/815.6, 340/426.13, 4.11, 12.22; 341/175, 176
See application file for complete search history.

(56) References Cited

U.S. PATENT DOCUMENTS

| | | | | |
|---|---|---|---|---|
| 6,407,779 | B1* | 6/2002 | Herz | 348/734 |
| 7,023,498 | B2* | 4/2006 | Ishihara | 348/734 |
| 7,295,252 | B2* | 11/2007 | Watanabe et al. | 348/734 |
| 7,324,168 | B2* | 1/2008 | Griesau et al. | 348/734 |
| 7,782,407 | B2* | 8/2010 | Hicks | 348/734 |
| 8,031,270 | B1* | 10/2011 | Wisniewski et al. | 348/734 |
| 2002/0129366 | A1* | 9/2002 | Schein et al. | 725/43 |
| 2002/0158772 | A1* | 10/2002 | Mears | 340/825.22 |
| 2004/0041712 | A1* | 3/2004 | Collovini et al. | 340/825.69 |

* cited by examiner

*Primary Examiner* — Jefferey Harold
*Assistant Examiner* — Mustafizur Rahman
(74) *Attorney, Agent, or Firm* — Orrick, Herrington & Sutcliffe, LLP

(57) ABSTRACT

Systems and methods that facilitate the elimination of interference of an IR signal emitted from an IR blaster by the IR signal emitted from a remote control unit. In a preferred embodiment in which an AV device coupled to a television receives IR signals repeated and transmitted by the television over an IR blaster cable, a right hand polarizer lens is positioned on the front of the remote control unit in front of the IR emitter and a left hand polarizer lens is positioned on the AV device in front of its IR detector. In operation, the IR beam emitted from the remote control unit is right hand polarized and is blocked by the left hand polarizer lens. The IR beam emitted from the IR blaster is randomly polarized and passes through the left hand polarizer lens with only a slight attenuation.

13 Claims, 1 Drawing Sheet

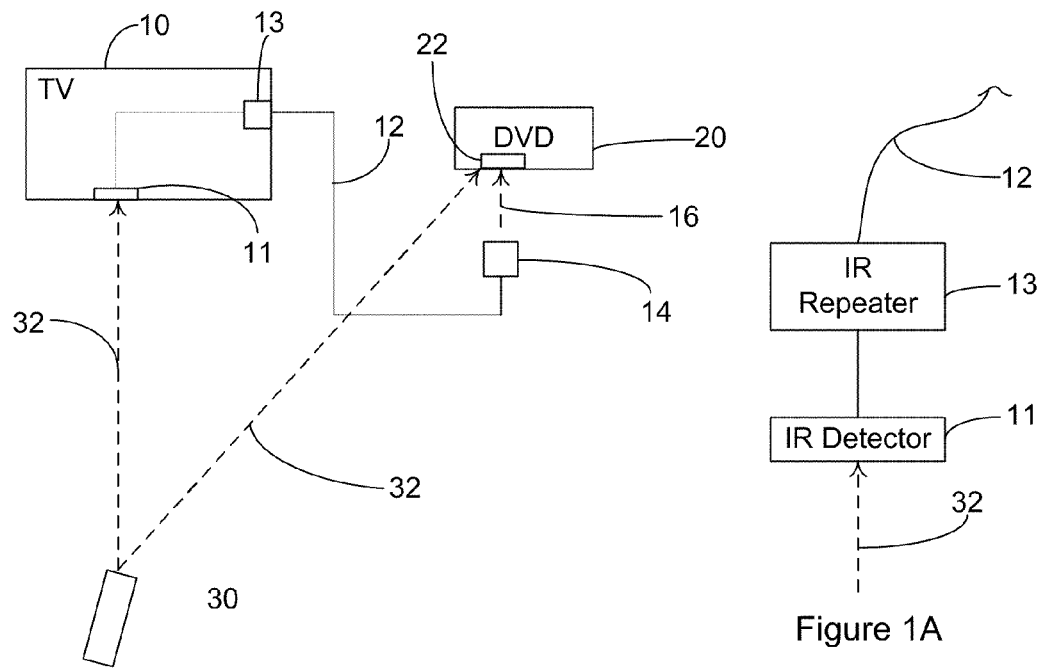
Figure 1
Figure 1A
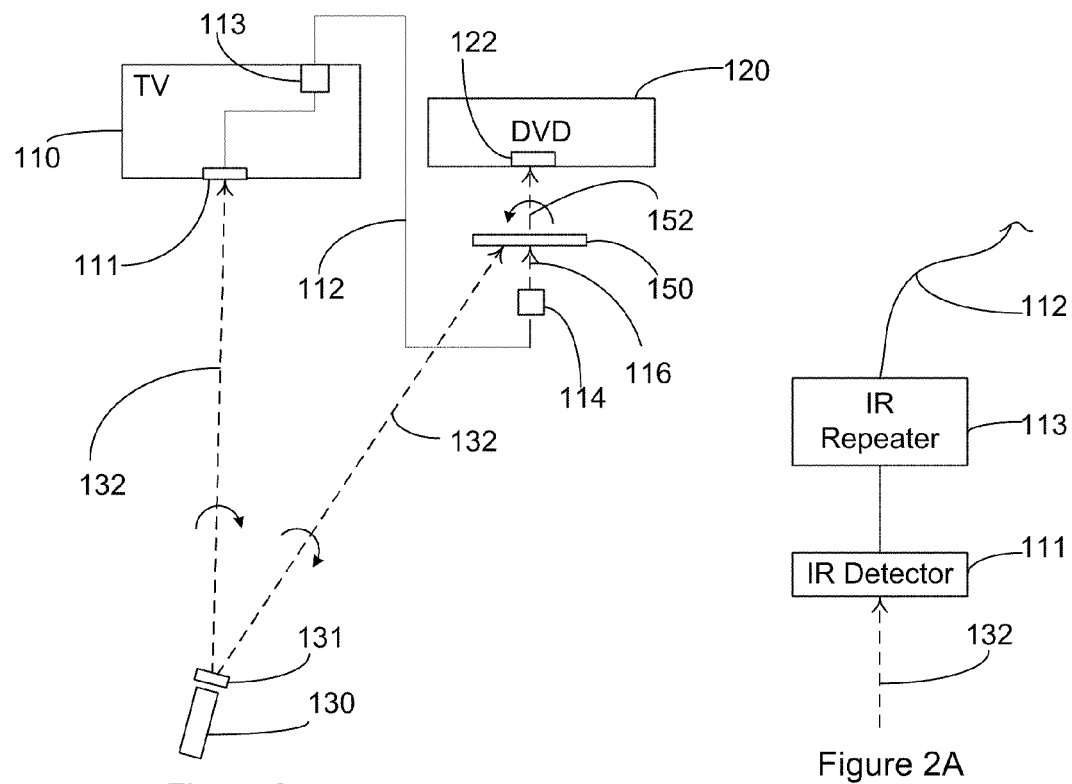
Figure 2
Figure 2A

IR SIGNAL CROSS-TALK ELIMINATION

CROSS-REFERENCE TO RELATED APPLICATION

This application claims the benefit of provisional application Ser. No. 61/093,647 filed Sep. 2, 2008, which is fully incorporated herein by reference.

FIELD

The embodiments described herein relate generally to the remote control of televisions and audio-video (AV) device coupled thereto and, more particularly, to systems and methods that facilitate the elimination of infra-red (IR) signal cross-talk in systems which utilize IR blasters to transmit IR commands to connected AV devices.

BACKGROUND INFORMATION

Most home entertainment systems include a television and one or more AV devices coupled to the television such as a DVD, a cable box, a VCR, and the like. In order to simplify control of the AV devices coupled to the television and eliminate line of sight issues related to the control of AV devices using a remote control unit that emits command codes embedded in an IR signal or light beam, many systems utilize IR blasters coupled to the television over an IR blaster cable. The blaster cable is used to simplify the control of a home theater by the use of a single remote control. By a simple IR repeating operation or a more complex code translation process in the TV or IR blaster assembly, a single remote control can be used for operating the entire AV system. The alternatives to such an implementation are for the user to utilize a different remote control for each AV device or to switch a multi-brand remote control among the various devices. However, in spite of the improvement offered by this system, there are situations when the user will prefer to use a remote control dedicated to his specific equipment. For example, if the TV is in an off state and the user prefers to listen to a CD player, direct control of the CD player would be preferred so that the TV would not have to be turned on just for control purposes. In this case the IR remote control for the CD player should remain functional.

As depicted in FIGS. 1 and 1A, the television 10 will have, among other components, an IR signal detector 11 to detect the IR signal 32 emitted from the TV remote control unit 30 and a repeater 13 to transmit the IR signal 32 over the IR blaster cable 12 to the IR blaster 14. The IR blaster 14, which is preferably positioned in front of an IR detector 22 of the AV device 20, blasts or emits the repeated IR signal 16 or an IR signal that has its coding translated from one format to another within the TV or in the blaster assembly itself. The repeated IR signal 16 emitted from the IR blaster 14 is detected by an IR detector 22 of the AV device 20. However, in conventional systems, the IR detector 22 will also detect the IR signal 32 emitted by the TV remote control unit 30. As a result, the IR signal 32 emitted by the TV remote control unit 30 interferes with the repeated or translated IR signal emitted 16 by the IR blaster 14 causing errors or faulty operation of the AV device 20.

Thus, it is desirable to provide systems and methods that would eliminate such interference.

SUMMARY

The embodiments provided herein are directed to systems and methods that facilitate the elimination of interference of an IR signal emitted from an IR blaster by the IR signal emitted from a remote control unit. In a preferred embodiment in which an AV device coupled to a television receives IR signals repeated and transmitted by the television over an IR blaster cable, a right hand polarizer lens positioned on the front of the remote control unit in front of the IR emitter and a left hand polarizer lens position on AV device in front of the IR detector. In operation, the IR beam emitted from the remote control unit, which is right hand polarized by the right hand polarizer lens positioned on the front of the remote, is blocked by the left hand polarizer lens position on AV device in front of the IR detector. The IR beam emitted from the IR blaster is randomly polarized and passes through the left hand polarizer lens with only a slight attenuation. Thus, the interference caused by the IR signal emitted by the remote control unit is effectively eliminated as a result.

Other systems, methods, features and advantages of the example embodiments will be or will become apparent to one with skill in the art upon examination of the following figures and detailed description.

BRIEF DESCRIPTION OF THE FIGURES

The details of the example embodiments, including fabrication, structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

FIG. 1 is a schematic of a television with an AV device coupled thereto.

FIG. 1A is a schematic of an IR detector, IR repeater and IR blaster cable assembly of the television shown in FIG. 1.

FIG. 2 is a schematic of a television with an AV device coupled thereto with polarizing lens positioned on the remote control unit and the AV device to eliminate IR beam interference.

It should be noted that elements of similar structures or functions are generally represented by like reference numerals for illustrative purpose throughout the figures. It should also be noted that the figures are only intended to facilitate the description of the preferred embodiments.

DETAILED DESCRIPTION

Each of the additional features and teachings disclosed below can be utilized separately or in conjunction with other features and teachings to produce systems and methods to the eliminate IR signal interference in the remote control of televisions and AV units. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

The systems and methods described herein are directed to the elimination of IR signal interference in the remote control of a television and AV units coupled thereto, wherein the AV units receive IR signals emitted by the remote control unit and repeated and transmitted by the television over IR blaster cables to IR blasters positioned positioned in front of the IR detectors of the AV units.

Turning in detail to the figures, FIG. 2 depicts a schematic of an AV device 120 such as a DVD, coupled to a television 110. An IR blaster 114 is positioned in front of an IR detector 122 of the AV device 120. The IR blaster 114 is coupled over an IR blaster cable 112 to the television 110. The television 110 includes an IR detector 111 and IR repeater 113, as shown in FIG. 2A, to repeat and transmit an IR signal 132 emitted from a remote control unit 130. To prevent interference between the repeated IR signal 116 emitted from the IR blaster 114 and the IR signal 132 emitted from the remote control unit 130, a polarizing lens 150 having a specified polarization such as, e.g., a left polarizing lens, is positioned in front of the AV device's IR detector 122 preferably on the AV device 120 and a polarizing lens 131 having a specified polarization that is opposite the polarization of the lens 150 positioned in front of the IR detector 122 of the AV device 120, such as, e.g., a right polarizing lens, is positioned on the remote control unit 130 in front of its IR emitter. Alternatively, the light emitting diode emitter of the remote control unit 130 has a specified polarization that is opposite the polarization of the lens 150 positioned in front of the IR detector 122 of the AV device 120. In operation, the repeated IR signal 116 that the IR blaster 114 emits is randomly polarized and passes through the left polarized lens 150 onto the AV device's IR detector 122 as a partially attenuated signal 152. The right polarized IR signal 32 emitted from the remote control unit 130 is blocked by the left polarized lens 150.

In the event the user desires to use the remote control dedicated to the particular AV device rather than the TV remote control, there would be no difficulty, because the IR signal from the remote control dedicated to the AV device would typically be randomly polarized and, thus, would pass through the left hand polarizer with minimal attenuation.

In an alternative embodiment, a remote control unit kit is provided that includes a universal remote control unit capable of being programmed to control a TV and a plurality of AV devices, a right polarizing lens couplable to the remote control unit in front of its IR emitter, and a left polarizing lens positionable between the IR emitter of an IR blaster and the IR detector of an AV device. Alternatively, the left polarizing lens can be couplable to the IR blaster in front of its IR emitter or the AV device in front of it IR detector. In a further alternative, the kit could comprise first and second oppositely polarizing lens, with the first lens couplable to a remote control unit in front of its IR emitter and the second lens positionable in front of an IR detector of a device to be controlled.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, unless otherwise stated, and the invention can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A television system comprising
   a television,
   an AV device coupled to the television, wherein the AV device includes a first polarizing lens positioned in front of its IR detector,
   a remote control unit operably coupled to the television, wherein the remote control unit comprises a second polarizing lens positioned in front of the remote control unit's IR emitter and having a polarization opposite to the first polarizing lens, and
   an IR blaster coupled to the television and operably coupled to the IR detector of the AV device.

2. The television system of claim 1 wherein the television includes an IR detector and an IR repeater coupled to the IR detector.

3. The television system of claim 2 further comprising an IR blaster cable coupled to the television and the IR blaster.

4. The television system of claim 1 wherein the IR blaster is wirelessly coupled to the television.

5. A television system comprising
   a television,
   a remote control unit operably coupled to the television, wherein the remote control unit is configured to emit IR signals having a first polarization,
   an IR blaster coupled to the television, and
   a first polarizing lens positionable between an IR emitter of the IR blaster and an IR detector of a device to be controlled and having a polarization opposite to the first polarization.

6. The television system of claim 5 wherein the television includes an IR detector and an IR repeater coupled to the IR detector.

7. The television system of claim 6 further comprising an IR blaster cable coupled to the television and the IR blaster.

8. The television system of claim 5 wherein the IR blaster is wirelessly coupled to the television.

9. The television system of claim 5 wherein the remote control unit includes a second polarizing lens coupled to the remote control unit in front of an IR emitter of the remote control unit.

10. A remote control unit kit comprising
    a universal remote control unit configurable to transmit IR signals to control a television and one or more AV devices couplable to the television,
    a first polarizing lens couplable to the universal remote control unit in front of the IR emitter of the remote control unit and having a first polarization, and one or more polarizing lens positionable in front of IR detector of the one or more AV devices, the one or more polarizing lens having a second polarization opposite to the first polarization.

11. A method of controlling one or more AV devices coupled to a television comprising the steps of
transmitting IR signals from a remote control unit at an IR signal detector of a television, the IR signals having a first polarization,
transmitting the IR signals from an IR repeater coupled to the IR signal detector of the television over an IR blaster cable,
emitting the IR signals from an IR emitter of an IR blaster coupled to the IR blaster cable at an IR detector of an AV device coupled to the television, the IR signals having a second polarization, and
blocking IR signals having a first polarization from reaching the IR detector of the AV device.

12. The method of claim 11 wherein the step of blocking includes filtering light detected by the IR detector of the AV device through a polarizing lens having a polarization opposite to the first polarization.

13. The method of claim 11 wherein the step of transmitting IR signals from a remote control unit having a first polarization includes passing the IR signals through a polarizing lens with the first polarization.

* * * * *